United States Patent
Wiggerich

(10) Patent No.: US 8,328,128 B2
(45) Date of Patent: Dec. 11, 2012

(54) AIRCRAFT

(76) Inventor: Burkhard Wiggerich, Arnsberg (DE)

( * ) Notice: Subject to any disclaimer, the term of this patent is extended or adjusted under 35 U.S.C. 154(b) by 373 days.

(21) Appl. No.: 12/306,346

(22) PCT Filed: Mar. 31, 2007

(86) PCT No.: PCT/DE2007/000592
§ 371 (c)(1),
(2), (4) Date: Dec. 23, 2008

(87) PCT Pub. No.: WO2008/000203
PCT Pub. Date: Jan. 3, 2008

(65) Prior Publication Data
US 2009/0250549 A1    Oct. 8, 2009

(30) Foreign Application Priority Data
Jun. 26, 2006   (DE) .......................... 10 2006 029 603

(51) Int. Cl.
*B64C 27/08* (2006.01)
(52) U.S. Cl. .................................. 244/17.23
(58) Field of Classification Search ............... 244/17.19, 244/17.21, 17.23, 17.25, 3.27, 3.28, 3.29; 416/128, 129, 130, 142, 143, 124, 125, 247 A, 416/247 R, 195, 196 R, 196 A; 446/37; D12/328
See application file for complete search history.

(56) References Cited

U.S. PATENT DOCUMENTS

| | | | | |
|---|---|---|---|---|
| 2,916,010 A | * | 12/1959 | Dimmer | 416/247 R |
| 5,066,254 A | * | 11/1991 | Bass et al. | 440/72 |
| 5,791,592 A | * | 8/1998 | Nolan et al. | 244/17.11 |
| 6,688,936 B2 | * | 2/2004 | Davis | 446/37 |
| 2005/0067527 A1 | * | 3/2005 | Petersen | 244/17.11 |
| 2006/0049304 A1 | * | 3/2006 | Sanders et al. | 244/23 A |

FOREIGN PATENT DOCUMENTS

| | | | |
|---|---|---|---|
| DE | 20120758 U1 | * | 12/2001 |
| DE | 202005004698 U1 | * | 3/2005 |
| DE | 202004017173 A1 | * | 5/2008 |
| JP | 50-019198 A | | 2/1975 |
| JP | 2006511399 A | | 4/2006 |
| JP | 2006-56364 A | | 9/2007 |
| JP | 2007535438 A | | 12/2007 |
| WO | WO 2005/099415 A2 | | 10/2005 |
| WO | WO 2006/112578 A1 | * | 10/2006 |
| WO | WO 2006112578 A1 | * | 10/2006 |

OTHER PUBLICATIONS

Canadian Office Action dated Jan. 27, 2009.

* cited by examiner

*Primary Examiner* — Timothy D Collins
*Assistant Examiner* — Jamie S Stehle
(74) *Attorney, Agent, or Firm* — Norris McLaughlin & Marcus, P.A.; Christa Hildebrand

(57) ABSTRACT

An aircraft includes at least three drive units, each of which has a first rotor and a first, rotary speed-controlled electrical motor, suitable for driving the first rotor during operation of the aircraft. Each of the drive units has at least a second rotor and at least one second, rotary speed-controlled electrical motor, suitable for driving the second rotor during operation of the aircraft in a rotational direction that is opposite to the rotational direction of the first rotor of each drive unit. Autonomous means for controlling the location and position of the aircraft are also provided.

20 Claims, 2 Drawing Sheets

Autonomous attitude and position control and interchangeable payload module

AIRCRAFT

BACKGROUND OF THE INVENTION

FIELD OF THE INVENTION

The present invention relates to an aircraft which has at least three drive units, which each have a first rotor and a first electric motor whose rotation speed is controlled, suitable for driving the first rotor during operation of the aircraft, and comprises means for autonomous attitude and position control of the aircraft.

Aircraft of the type mentioned initially are already known in various embodiments from the prior art. For example, at this point, it is intended to describe an aircraft which was developed several years ago, is in the form of a microdrone and has four drive units, each having a rotor in order to produce lift. The known aircraft furthermore comprises electronic attitude control, which, for example, allows the aircraft to assume a hovering flight attitude. The aircraft can be controlled by varying the rotation speeds of the electric motors, with each electric motor being operated individually by a central control unit.

One disadvantage of the four-rotor aircraft which are known from the prior art is that they are designed to be relatively large in order to allow them to transport a specific payload.

This is the purpose of the present invention.

BRIEF SUMMARY OF THE INVENTION

The present invention is based on the object of providing an aircraft of the type mentioned initially which, while retaining the payload, is more compact than the four-rotor aircraft known from the prior art.

This object is achieved by an aircraft including at least three drive units, which each have a first rotor and a first electric motor whose rotation speed is controlled, suitable for driving the first rotor during operation of the aircraft, and means for autonomous attitude and position control of the aircraft. The dependent claims relate to advantageous developments of the present invention.

An aircraft according to the invention is distinguished in that each of the drive units has at least one second rotor and at least one second electric motor whose rotation speed is controlled, suitable for driving the second rotor during operation of the aircraft, in a rotation direction which is opposite the rotation direction of the first rotor of the respective drive unit.

Instead of four drive units each having one rotor, the aircraft according to the invention has at least three drive units each having at least two rotors, which are driven in pairs in opposite directions. The advantage of this measure is that the aircraft can be made more compact than the aircraft known from the prior art, while retaining the payload. This measure advantageously allows the diameter of the aircraft to be reduced by about 30%. Since at least three drive units, each having two rotors, are provided, efficient position and attitude control can be provided for the aircraft. The provision of at least two rotors per drive unit furthermore has the advantage of improved redundancy. If, for example, one rotor of the drive unit fails during operation of the aircraft, the remaining second rotor can provide sufficient thrust in order to move the aircraft or to maintain its position. The electric motors are preferably brushless and have no transmission. The means for autonomous attitude and position control of the aircraft may, for example, have gyroscopic sensors and acceleration sensors in addition to a central control unit. Furthermore, the aircraft can preferably have one or more of the sensor means mentioned below (also in combination):

rotation rate sensors,
acceleration sensors,
barometric sensors
magnetometric sensors,
Ultrasound sensors,
GPS sensors,
optical sensors.

In one preferred embodiment, it is possible for the first rotors of at least two drive units to have a common rotation plane. In particular, it is also possible for the first rotors of all the drive units to have a common rotation plane, in order to improve the flying characteristics of the aircraft.

In one preferred embodiment, it is possible for the second rotors of at least two drive units to have a common rotation plane. Furthermore, in one particularly preferred embodiment, it is possible for the second rotors of all the drive units to have a common rotation plane. This measure allows the flying characteristics of the aircraft to be improved further.

The rotation planes of the first and second rotors may in particular be oriented essentially parallel to one another.

The first and second rotors of at least one of the drive units are preferably separated from one another in the axial direction. In one advantageous embodiment, it is also possible for the first and second rotors of each of the at least three drive units to be separated from one another in the axial direction.

In one preferred embodiment, the first and second rotors of at least one of the drive units can be arranged coaxially. It is particularly preferable for the first and second rotors of each of the at least three drive units to be arranged coaxially.

In one advantageous embodiment, it is possible for the aircraft to have a support for the drive units, which support comprises a number of supporting arms to each of which at least one of the drive units is fitted. The supporting arms may, for example, extend away from a centerpoint of the support in the radial direction.

In one preferred embodiment, the support may comprise a base body to which the supporting arms are fitted. For example, parts of the central control unit, sensor means, transmitter and receiver means for communication of the aircraft with a ground station can be accommodated within the base body.

In order to simplify the assembly and the disassembly of the aircraft, it is possible for the supporting arms to be detachably fitted to the base body, in particular by means of quick-release fasteners.

In order to avoid damage to the rotors of the drive units in the event of a collision with an obstruction, one particularly preferred embodiment provides for the aircraft to comprise a collision protection device for the rotors. This measure makes it possible, for example, to prevent one of the rotors from breaking on contact with an obstruction.

In order to simplify the disassembly of the aircraft, it is possible in one advantageous embodiment for the collision protection device to be detachably fitted to the support, in particular to be detachably fitted to the supporting arms. For example, one or more plug or clip connections can be provided in order to detachably fit the collision protection device to the supporting arms.

In one advantageous embodiment, the collision protection device may comprise at least one rotor protection ring which extends along the outer circumference of the aircraft. For example, it is also possible for the collision protection device to comprise a first rotor protection ring and a second rotor protection ring, which extend along the outer circumference of the aircraft. In a further variant, more than two rotor protection rings may also be provided. The rotor protection ring or rings may, for example, be produced from plastic.

The rotor protection rings are preferably oriented essentially parallel to one another. Furthermore, the rotor protection rings can be connected to one another by a number of holding crossmembers. The holding crossmembers, which preferably extend orthogonally with respect to the plane of the rotor protection rings, can be detachably fitted to the supporting arms.

In order to prevent damage to the aircraft during landing, in one advantageous embodiment it is possible to provide for the aircraft to have a landing frame which can preferably be plugged on, and is therefore designed to be detachable.

Different payloads can be transported with the aid of the aircraft proposed here. For example, the aircraft can be used to transport one or more cameras and/or sensors for environmental analysis, in order to take airborne photographs, or to record environmental analysis data.

In order to allow the payloads, which can be transported by means of the aircraft, to be interchanged in a simple manner, one particularly advantageous embodiment proposes that the aircraft have an interchangeable payload module.

Further features and advantages of the present invention will become evident from the following description of preferred exemplary embodiments and with reference to the attached figures, in which:

DESCRIPTION OF THE INVENTION

Figure 1:
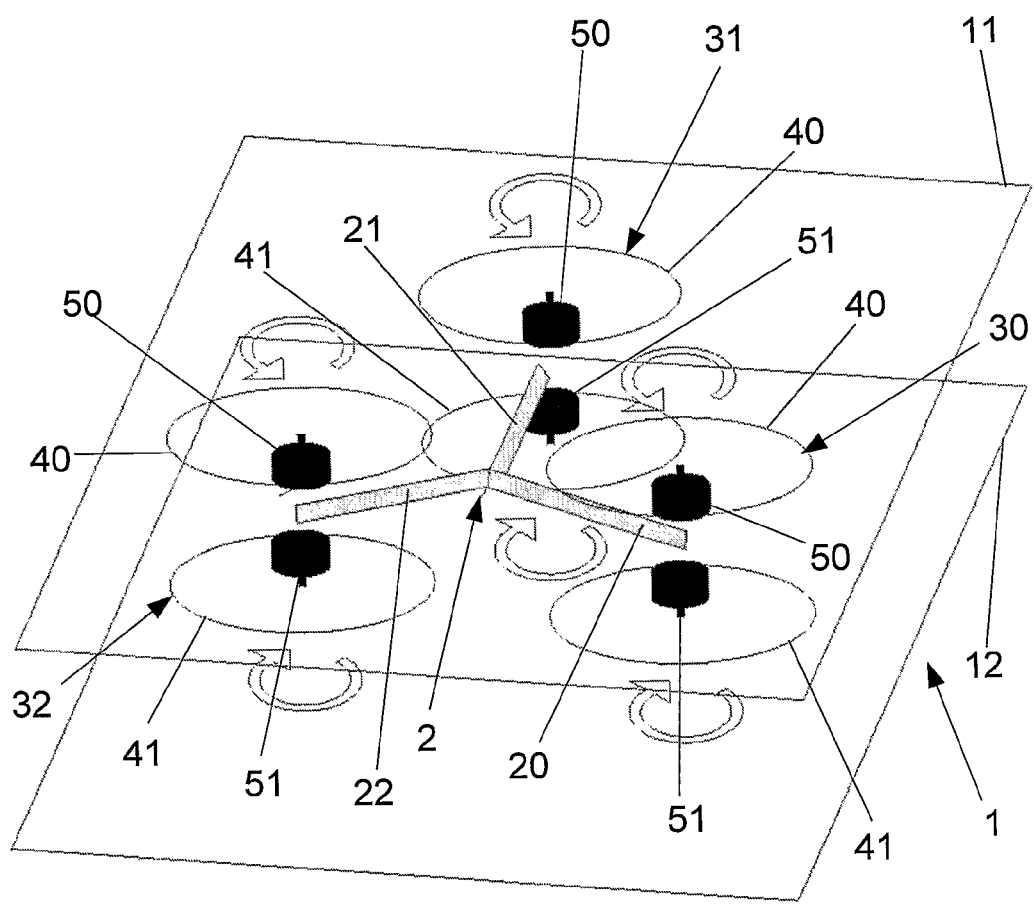
FIG. 1 shows a schematic illustration of the basic functional principle of an aircraft according to the present invention.

First of all, reference is made to FIG. 1, which schematically illustrates, in a highly simplified form, the basic functional principle of an aircraft 1 which is designed according to the present invention as a so-called microdrone.

The aircraft 1 has a support 2 which, in this exemplary embodiment, has three supporting arms 20, 21, 22 which extend outwards in the radial direction from a common centerpoint. A respective drive unit 30, 31, 32 is arranged on each of the three supporting arms 20, 21, 22. Each of the three drive units 30, 31, 32 comprises a first rotor 40 and a second rotor 41, which are indicated only schematically as ellipses in FIG. 1. As can be seen, the first and second rotors 40, 41 of the drive units 30, 31, 32 are each arranged coaxially in this exemplary embodiment. The first and second rotors 40, 41 of the drive units 30, 31, 32 are in this case separated from one another in the axial direction such that, during operation of the aircraft 1, the first rotors 40 of all the drive units 30, 31, 32 rotate jointly on a first rotation plane 11, and the second rotors 41, rotate jointly on a second rotation plane 12, which is oriented essentially parallel to the first rotation plane 11.

Each of the three drive units 30, 31, 32 in this exemplary embodiment has two electric motors 50, 51, whose rotation speed is controlled and which preferably have no transmission, and which in particular may be electronically commutated direct-current motors. In this exemplary embodiment, an electric motor 50, 51 whose rotation speed is controlled is therefore in each case associated with each rotor 40, 41 of the drive units 30, 31.

During operation of the aircraft 1, the first rotors 40 and the second rotors 41 of the drive units 30, 31 rotate in opposite directions. As is indicated by arrows in FIG. 1, the first rotors 40 of the three drive units 30, 31, 32 may, for example, rotate in the counterclockwise direction on the rotation plane 11, while their second rotors 41 rotate in the clockwise direction on the rotation plane 12.

Both the position and the movement of the aircraft 1 can be controlled by individual setting of the rotation speeds of the electrics motors 50, 51 of each of the three drive units 30, 31, 32. For this purpose, the aircraft 1 has a central control unit, which is not shown explicitly here, that is coupled to the electric motors 50, 51 whose rotation speeds are controlled, such that they can be operated individually. Each electric motor 50, 51 preferably has an associated rotation-speed controller, which is connected to the central control unit such that the rotation speeds of all the electric motors 50, 51 of the drive units 30, 31, 32 can be varied on an individually controlled basis. Suitable sensor means are provided in order to record flight data and operating data of the aircraft 1, and these will be described in more detail further below.

Autonomous attitude and position control of the aircraft 1 can be achieved by the measures described above and by appropriate design of the programming software of the central control unit. The aircraft 1 proposed here may, for example, carry out hovering flight. The central control unit allows controllability of the aircraft 1 in all three spatial directions and, furthermore, rotation of the aircraft 1 about its vertical axis. This is done by individual variation and matching of the rotation speeds of the electric motors 50, 51 of the drive units 30, 31, 32 to the respective flight situation.

The physical design of the aircraft 1 with three drive units 30, 31, 32, each having two coaxially arranged rotors 40, 41 which rotate in opposite rotation directions during operation makes it possible to provide an aircraft 1 which is physically more compact than the aircraft which are known from the prior art and normally have four or more drive units. This makes it possible to move a large payload over a comparatively long flight time. The provision of two electric motors 50, 51, whose rotation speeds are controlled, per drive unit 30, 31 furthermore has the advantage that the aircraft 1 has improved redundancy. For example, if one of the electric motors 50, 51, whose rotation speeds are controlled, of one of the drive units 30, 31, 32 fails, the second electric motor 50, 51 can still provide sufficient thrust in order to prevent the aircraft 1 from becoming uncontrollable and, for example, crashing.

As already mentioned above, the aircraft 1 has a plurality of sensor means in order, for example, to allow the position of the aircraft 1 and the current flight data and operating data to be recorded. For example, the aircraft 1 may have one or more of the sensor means (also in combination) mentioned below:
rotation rate sensors,
acceleration sensors,
barometric sensors,
magnetometric sensors,
Ultrasound sensors,
GPS sensors,
optical sensors.

The measurement data recorded by the sensor means during operation of the aircraft 1 is supplied to the central control unit and is processed further by the latter. If necessary, the central control unit then sends individual control signals to the electric motors 50, 51, 52 of the drive units 30, 31, 32 in order to individually vary their rotation speeds.

The aircraft 1 proposed here can be used to transport different payloads, for example one or more cameras or sensors for recording environmental data (gas sensors, radiological sensors or the like). The aircraft 1 preferably has an interchangeable payload module which, in particular, is detachably fitted to the support 2 in order that the payload can easily and quickly be interchanged.

Furthermore, the aircraft 1 comprises transmitter and receiver means which are suitable for transmitting data (for example a video signal from the camera and/or sensor signals) from the aircraft 1 to ground transmitting and receiving station, and/or for receiving control signals from a ground transmitting and receiving station.

Figure 2:
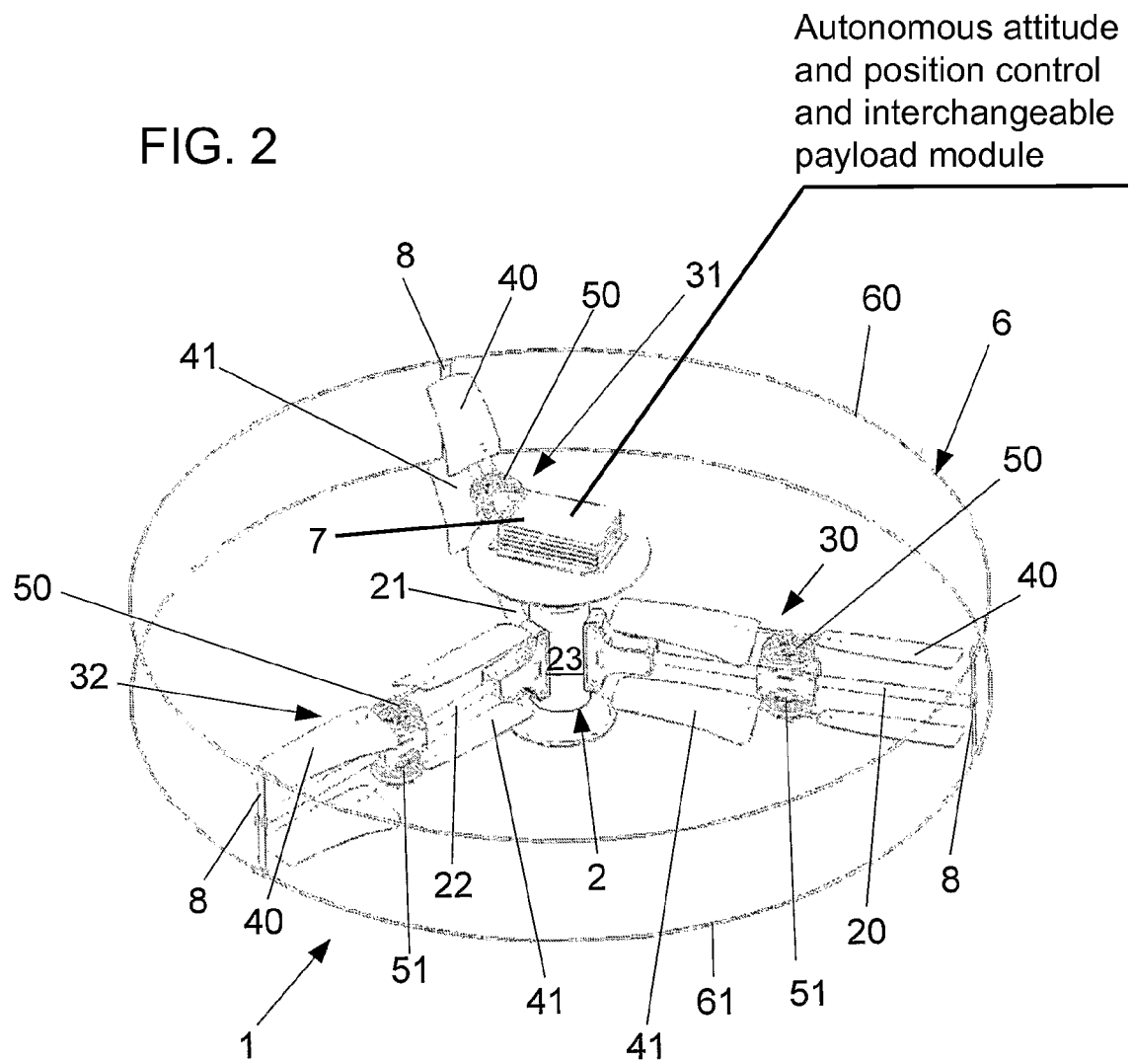
FIG. 2 shows a perspective view of an aircraft according to one preferred exemplary embodiment of the present invention.

FIG. 2 shows a perspective illustration of one preferred exemplary embodiment of the aircraft 1, which is illustrated only schematically and in a highly simplified form in FIG. 1. The aircraft 1 is a microdrone which is designed such that its physical size is so compact that, for example, it can even fly into a building.

The figure once again shows a support 2 which, in this exemplary embodiment, has a central essentially cylindrical base body 23. Three supporting arms 20, 21, 22 are fitted to an outer envelope surface of the base body 23 and extend away from the base body 23 in the radial direction. In order to allow the aircraft 1 to be disassembled again if required, the three supporting arms 20, 21, 22 are detachably fitted to the base body 23 in this exemplary embodiment. In order to simplify assembly and disassembly of the aircraft 1, the supporting arms 20, 21, 22 can preferably be fitted in an interlocking manner to the base body 23, with the aid of quick-release fasteners.

Once again, one of a total of three drive units 30, 31, 32 is fitted to each of the three supporting arms 20, 21, 22. Each of the three drive units 30, 31, 32 in each case comprises a first two-bladed rotor 40 and a second two-bladed rotor 41, which is separated from the first rotor 40. The two rotors 40, 41 of the drive units 30, 31, 32 are each arranged coaxially one above the other while, during operation of the aircraft 1 on the basis of the basic functional principle as explained above with reference to FIG. 1, the first rotors 40 of all the drive units 30, 31, 32 rotate on a common rotation plane, and the second rotors 41 of the drive units 30, 31, 32 likewise rotate on a common rotation plane.

Each of the three drive units 30, 31, 32 has two electric motors 50, 51, whose rotation speeds are controlled and which are each associated with one of the two rotors 40, 41 and drive them independently of one another, and cause them to rotate, during operation of the aircraft 1. The electric motors 50, 51 whose rotation speeds are controlled are preferably designed without any transmission and can, in particular, be electronically commutated direct-current motors. As already mentioned above, the first rotors 40 of the drive units 30, 31, 32 are each driven in the opposite directions to the second rotors 41 during operation of the aircraft 1. The direct-current motors 50, 51 are operated individually by the central control unit of the aircraft 1 in order, if required, to vary their rotation speeds.

In order to simplify the fitting of the rotors 40, 41 to the supporting arms 20, 21, 22, assembly means which require no tools can preferably be provided. For example, grooves can be provided with an O-ring, with the grooves each extending around a driver pin of the electric motors 50, 51. The base body 23 may, for example, have an electrical identification for coding of the electric motors 50, 51 in order in this way to simplify assembly of the aircraft 1.

Furthermore, the aircraft 1 has a housing 7 in which, for example, the payload, such as a camera, sensors for the recording of environmental data or the like, can be accommodated.

By way of example, the central control unit, one or more sensor means as well as transmitter and receiver means can be accommodated in the housing 7 or in the base body 23 of the support 1.

In order to allow the position and current flight data of the aircraft 1 to be recorded, the aircraft 1 has one or more of the sensor means (also in combination) listed by way of example below:
  rotation rate sensors,
  acceleration sensors,
  barometric sensors,
  magnetometric sensors,
  Ultrasound sensors,
  GPS sensors,
  optical sensors.

In order to make it possible to avoid damage to the rotors 40, 41 in the event of a collision with an obstruction, the aircraft 1 in this exemplary embodiment has a rotor protection device 6 which extends along the outer circumference of the aircraft 1. The rotor protection device 6 has a first rotor protection ring 60 and a second rotor protection ring 61, which are separated from one another in the axial direction with the aid of three holding crossmembers 8. The two protection rings 60, 61 are preferably detachably fitted—for example via a plug connection or clip connection—to the holding crossmembers 8. The holding crossmembers 8 may themselves likewise be detachably fitted—for example via a plug connection or a clip connection—to the supporting arms 20, 21, 22.

On its underneath, the aircraft 1 may furthermore have a landing frame, which is not explicitly illustrated here, that can be preferably be plugged on and which, inter alia, can prevent damage to the aircraft 1 during landing.

The invention claimed is:

1. An aircraft, comprising:
   autonomous attitude and position control provided by at least three drive units, each of said drive units having:
     a first rotor;
     a first rotary speed-controlled electric motor configured for driving said first rotor in a rotation direction during operation of the aircraft;
     at least one second rotor;
     at least one second rotary speed-controlled electric motor configured for driving said at least one second rotor during operation of the aircraft in a rotation direction opposite to said rotation of said first rotor of said respective drive unit;
     said first rotary speed-controlled electric motor and said at least one second rotary speed-controlled electric motor having rotary speeds being variable on an individual basis; and
   a support for said drive units, said support including a number of supporting arms extending radially outward from and secured only to a central base body without the drive units beingsecured to each other, at least one of said drive units being fitted to each respective one of said supporting arms.

2. The aircraft according to claim 1, wherein said first rotors of at least two of said drive units have a common rotation plane.

3. The aircraft according to claim 1, wherein said first rotors of all of said drive units have a common rotation plane.

4. The aircraft according to claim 1, wherein said second rotors of at least two of said drive units have a common rotation plane.

5. The aircraft according to claim 1, wherein said second rotators of all of said drive units have a common rotation plane.

6. The aircraft according to claim 1, wherein:
said first rotors of at least two of said drive units have a common rotation plane;
said second rotors of at least two of said drive units have a common rotation plane;
said rotation planes of said first and second rotors are oriented substantially parallel to one another.

7. The aircraft according to claim 1, wherein said first and second rotors of at least one of said drive units are separated from one another in axial direction.

8. The aircraft according to claim 1, wherein said first and second rotors of each of said at least three drive units are separated from one another in axial direction.

9. The aircraft according to claim 1, wherein said first and second rotors of at least one of said drive units are disposed coaxially.

10. The aircraft according to claim 1, wherein said first and second rotors of each of said drive units are disposed coaxially.

11. The aircraft according to claim 1, wherein said supporting arms are detachably fitted to said base body or are fitted to said base body by quick-release fasteners.

12. The aircraft according to claim 1, which further comprises a collision protection device for said rotors.

13. The aircraft according to claim 1, which further comprises a collision protection device for said rotors, said collision protection device being detachably fitted to said support or to said supporting arms.

14. The aircraft according to claim 12, wherein said collision protection device includes at least one rotor protection ring extending along an outer circumference of the aircraft.

15. The aircraft according to claim 12, wherein said collision protection device includes a first rotor protection ring and a second rotor protection ring extending along an outer circumference of the aircraft.

16. The aircraft according to claim 15, wherein said rotor protection rings are oriented substantially parallel to one another.

17. The aircraft according to claim 15, which further comprises a number of holding crossmembers interconnecting said rotor protection rings.

18. The aircraft according to claim 17, wherein said holding crossmembers are detachably fitted to said supporting arms.

19. The aircraft according to claim 1, which further comprises an aircraft landing frame.

20. The aircraft according to claim 1, which further comprises an interchangeable payload module.

* * * * *